Sept. 6, 1955  R. M. BARRETT  2,717,131
AIRCRAFT WITH FIXED AND ROTARY WINGS
Filed May 6, 1954  4 Sheets-Sheet 1

INVENTOR
Roger M. Barrett

BY Mason, Fenwick & Lawrence
ATTORNEYS

INVENTOR
Roger M. Barrett
BY Mason, Fenwick & Lawrence
ATTORNEYS

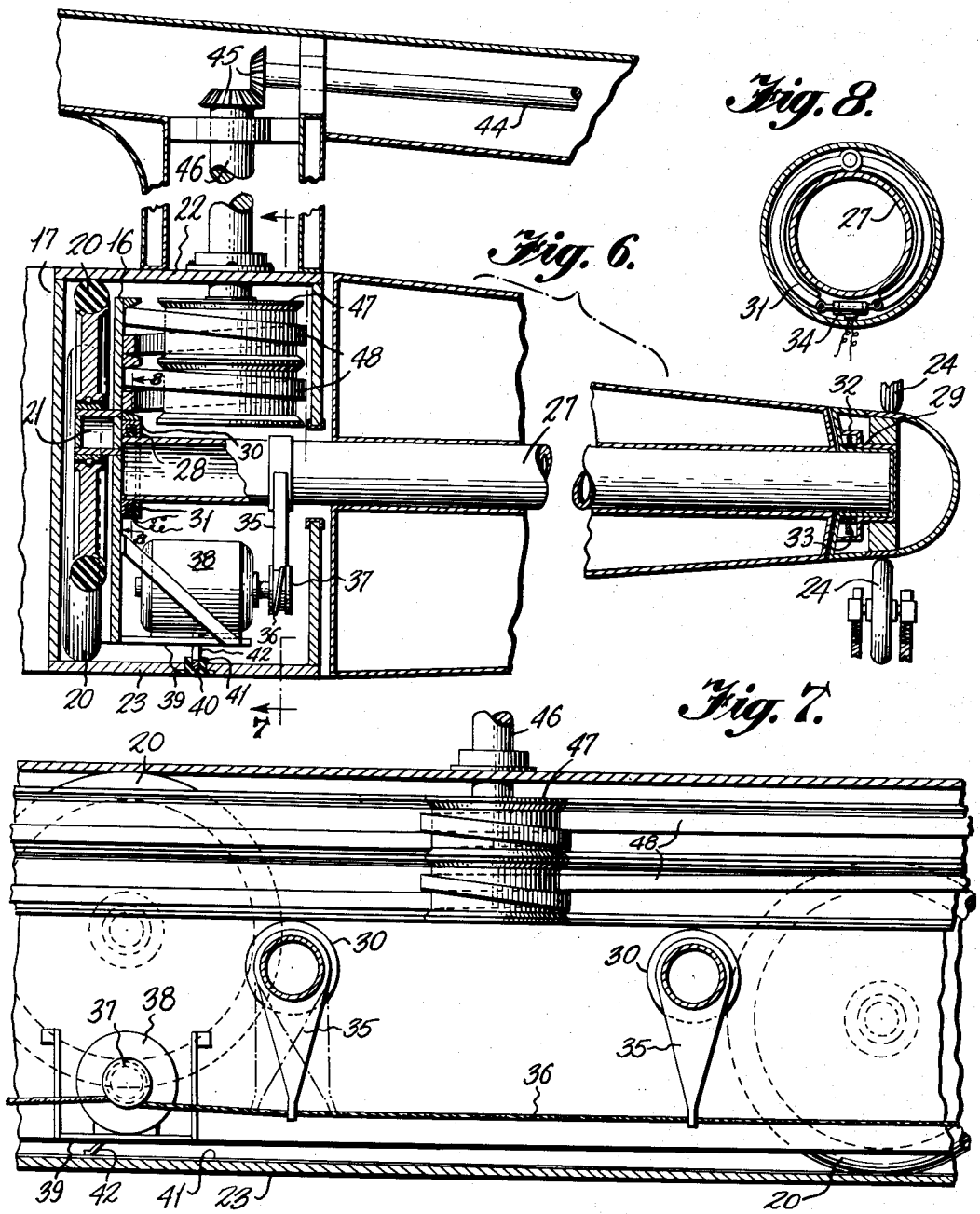

Sept. 6, 1955 R. M. BARRETT 2,717,131
AIRCRAFT WITH FIXED AND ROTARY WINGS
Filed May 6, 1954 4 Sheets-Sheet 4
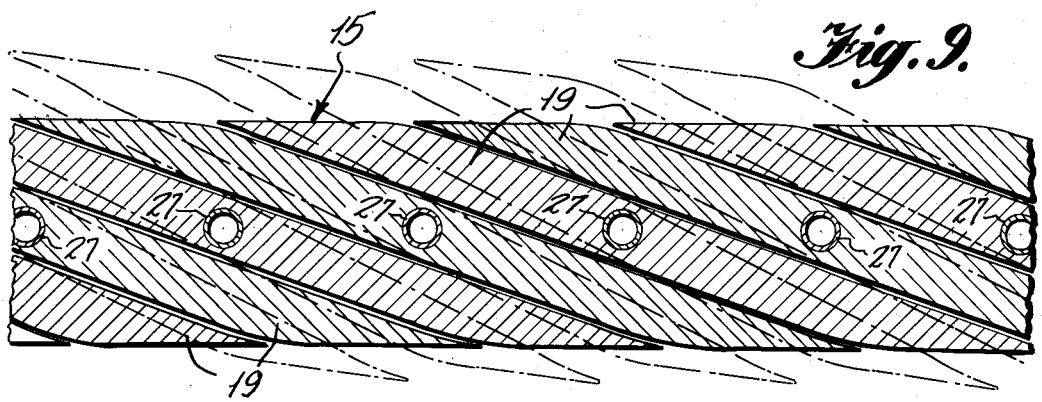
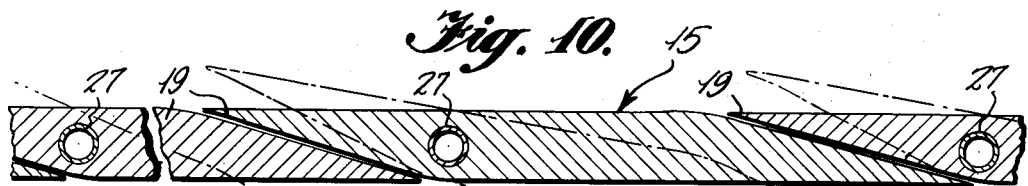
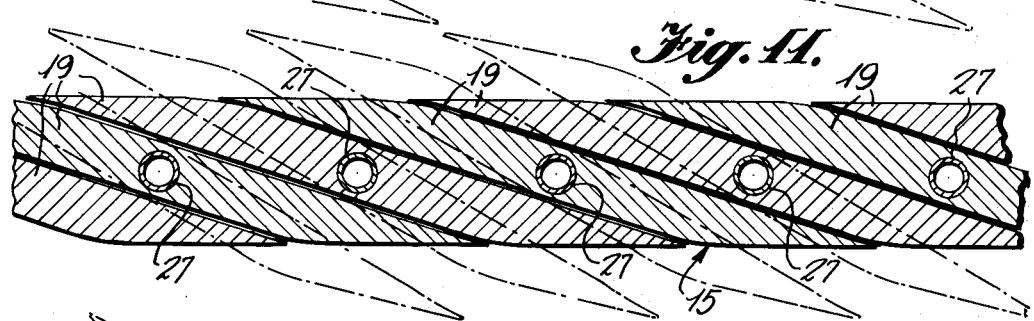
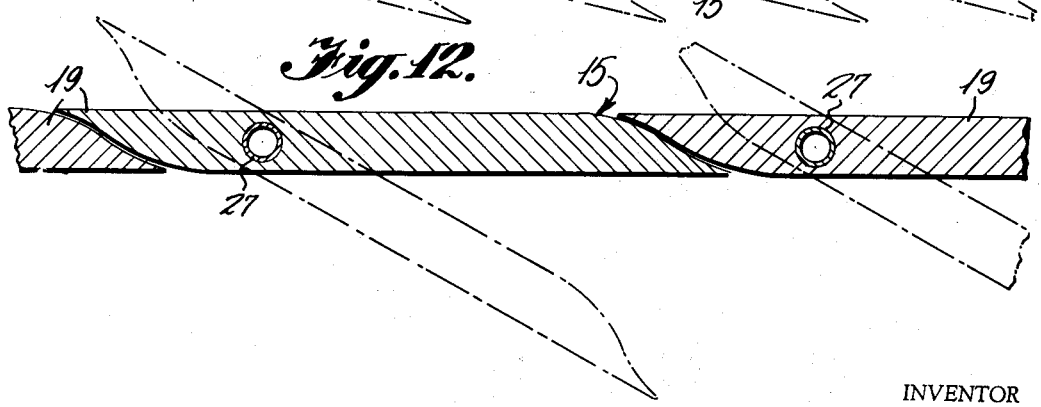
INVENTOR
Roger M. Barrett
BY
Mason, Fenwick, & Lawrence
ATTORNEYS United States Patent Office 2,717,131
Patented Sept. 6, 1955

2,717,131

AIRCRAFT WITH FIXED AND ROTARY WINGS

Roger M. Barrett, McComb, Miss.

Application May 6, 1954, Serial No. 427,977

7 Claims. (Cl. 244—6)

This invention relates to aircraft, and particularly to that type known as convertible aircraft, or convertaplanes.

It has been thought for some years that convertible aircraft, that is aircraft combining the features of the rigid wing airplane for maximum forward flight efficiency with those of the helicopter for vertical takeoff and landing and the ability to hover, are the answer to military and commercial flight problems. Such aircraft incorporate the best features of both types in common use today. Many problems have prevented the perfection of a practical design. Heretofore, the proposals have been to combine the operating units of the two types into a single aircraft with the result that the operating units for the individual propelling devices has prevented the efficient operation of the other. Other proposals have been to change the angular positions of the propelling members from horizontal to vertical to provide lift or forward propulsion as required. This imposes terrific strains and stresses, and uncontrolled flight during conversion periods. Despite these drawbacks, it is recognized that convertible aircraft present safety factors and extended uses not to be had with either of the standard types.

It is the principal object of the present invention to provide improved aircraft which combines the most desired flight characteristics of rotary-wing aircraft with those of fixed-wing aircraft, and in which the features of both may be used simultaneously or separately and there will be no drastic conversion necessary to change from one to the other.

Another object of the invention is to provide a plane which will have unusual safety factors, which is relatively small and suitable for family use.

A more specific object of the invention is to provide a convertible plane in which the passenger cab forms a hub upon which the lifting rotor is mounted for rotation in a horizontal plane.

A still further object is the provision of an aircraft of this type in which the parts provided for forward flight and those for imparting lift mutually cooperate to give strength to the whole.

Other objects of the invention will become apparent from the following description of practical embodiments thereof when taken in conjunction with the drawings which accompany, and form part of, this specification.

In the drawings:

Figure 6 is a fragmentary section through the aircraft taken on the line 6—6 of Figure 5 and illustrating the mounting and drive means for the rotating disk;

Figure 7 is a vertical section taken on the line 7—7 of Figure 6;

Figure 8 is a detail vertical section taken on the line 8—8 of Figure 6 illustrating the mounting of the pivot shaft of the tiltable airfoils making up the rotating disk;

Figure 9 is a horizontal section through the tilting airfoils, or vanes, in closed position taken closely adjacent the hub and showing in dotted lines the positions of the vanes when tilted to provide lift;

Figure 10 is a similar view taken near the outer edge of the disk;

Figure 11 is a view similar to Figure 9 showing a slightly modified shape of tilting airfoil or vanes; and, Figure 12 is a view similar to Figure 10 through the structure shown in Figure 11.

Figure 1:
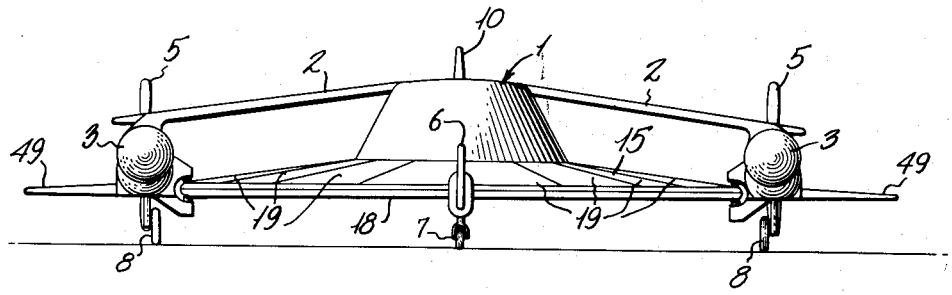
Figure 1 is a front elevation of a convertible aircraft embodying the principles of the present invention.
Figure 2:
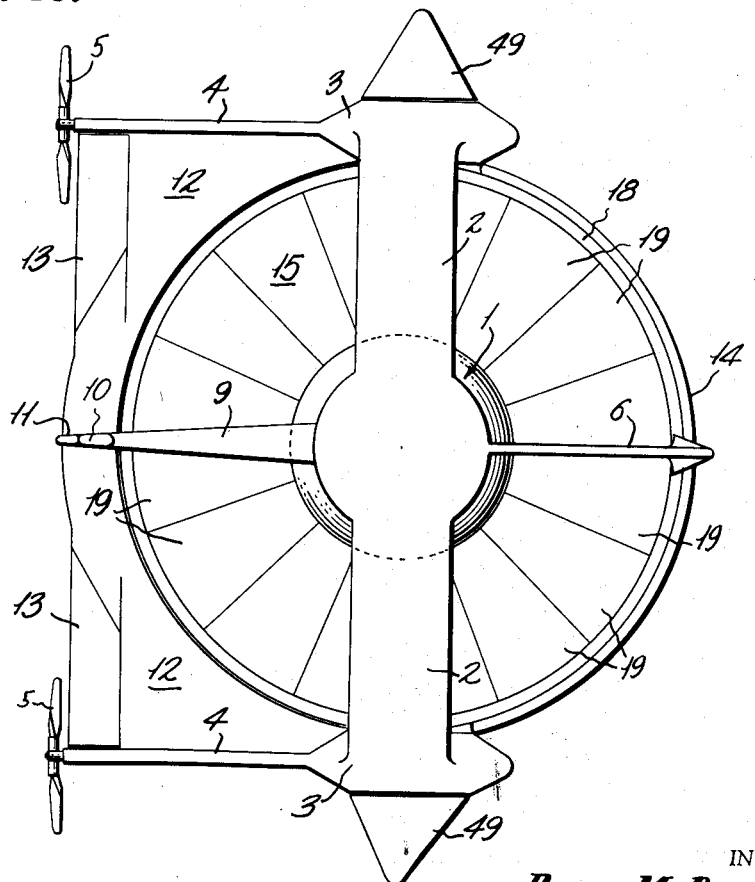
Figure 2 is a top plan view of the aircraft shown in Figure 1.
Figure 3:
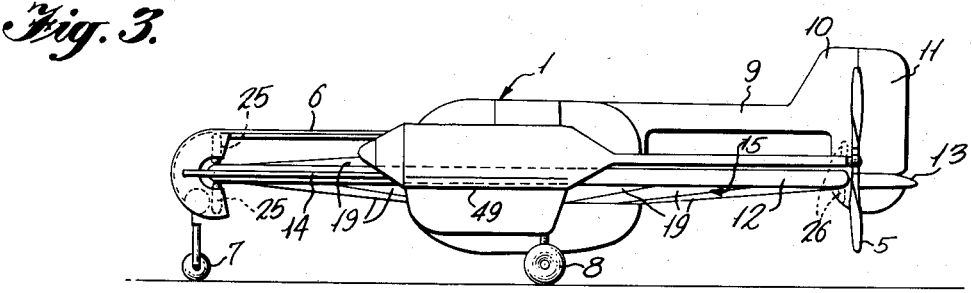
Figure 3 is a side view of a convertible aircraft embodying the same principles but of slightly modified design.
Figure 4:
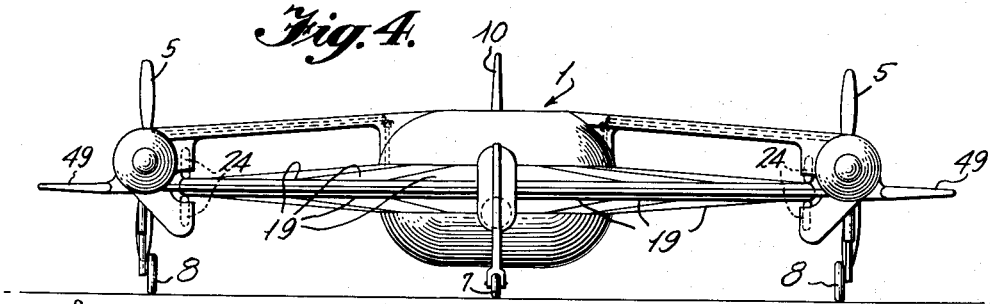
Figure 4 is a front elevation of the aircraft shown in Figure 3.
Figure 5:
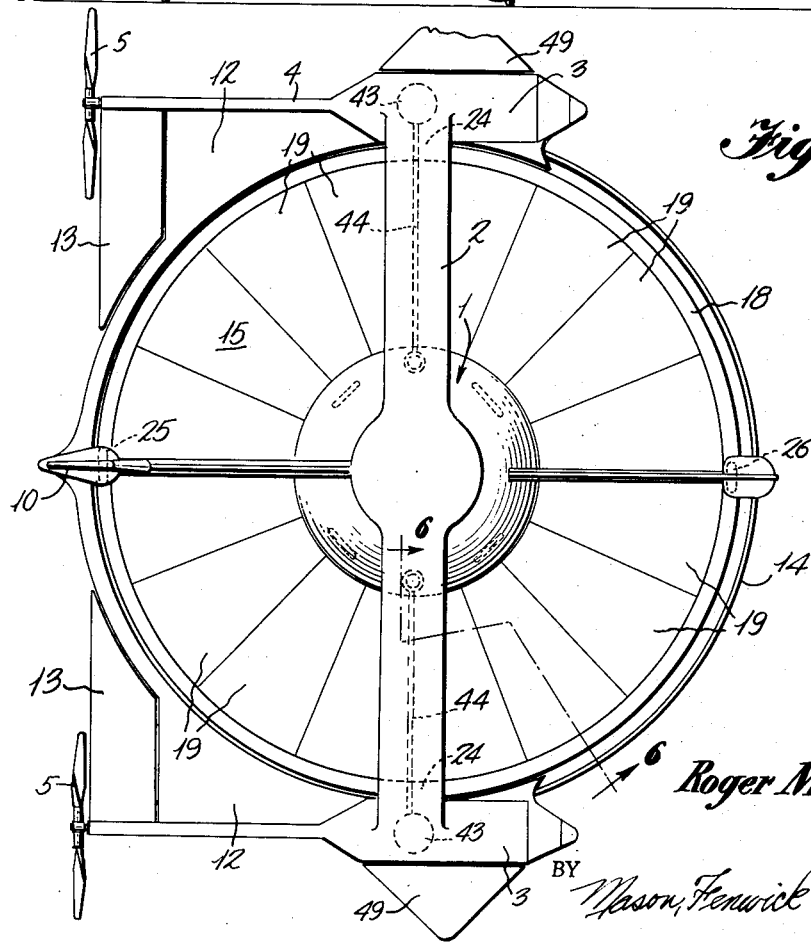
Figure 5 is a top plan view thereof.

In general, the aircraft consists of a passenger cab which forms a hub about which a disk composed of a plurality of tiltable vanes rotates. A rigid structure connected to the passenger cab forms a support for the disk and also for the engine nacelles, tail empennage and landing gear. All of these structural parts are in turn tied together to further rigidify the device. Two designs have been shown, one in Figures 1 and 2 showing the disk as having a flat bottom and an inclined upper surface, and the one shown in Figures 3 to 5 wherein the disk is symmetrical about a horizontal central plane. In other respects the structures are identical.

Referring to the drawings in detail, there is shown a central passenger cab 1 which is generally spherical in contour but flattened at the poles. The cab will house all of the necessary controls and have seats for the pilot and passengers. It is contemplated that the cab will be approximately the size of an automobile body and have a similar seating arrangement. Any desirable arrangement may be used for entry to and exit from the cab.

Rigid airfoils, or wings, 2 extend from opposite sides of the cab and have engine nacelles secured to their outer ends. Engines for operating the aircraft will be mounted in the nacelles and each will have a rearwardly projecting shaft 4 carrying a pusher type propeller 5 at its end. A forward strut 6 is provided to carry a nose wheel 7, and the engine nacelles support the landing wheels 8. A rearwardly extending strut 9 supports the tail empennage. This consists of the usual vertical stabilizer 10, rudder 11, horizontal stabilizer 12 and horizontal control flaps 13. The horizontal stabilizers have arcuate inner surfaces to frame the disk and are connected to both the rear strut 9 and the engine nacelles 3. Arcuate struts 14 are positioned horizontally and have their ends connected to the engine nacelles and the forward strut 6. The struts 14 with the horizontal stabilizer and their connecting structure form a circular frame concentric with the passenger cab 1. The rotor 15 is positioned between the cab and the frame and rotates within the space defined by these members.

The rotor is composed of an annular inner rim 16 mounted for rotation wtihin a hub channel 17 secured to the cab 1, an outer rim 18, and a plurality of tiltable vanes 19 radially positioned and pivotally mounted in the inner and outer rims of the rotor. The inner rim 16 carries a plurality of circumferentially spaced and vertically staggered supporting wheels 20 journalled on trunnions 21 which project radially inward from the inner face of the rim 16. The wheels are staggered vertically so that the upper wheels will ride upon the underside of the top horizontal flange 22 of the hub channel 17 and the lower wheels will ride upon the upper surface of the lower horizontal flange 23 of the channel 17. This will prevent vertical movement of the inner rim of the rotor. The engine nacelles 3 each carry a pair of spaced wheels 24 to ride upon the upper and lower surfaces of the outer rim 18 of the rotor and hold the outer rim against vertical movement. The forward strut 6 also carries a plurality of spaced wheels 25 to support the outer rim and the rearwardly extending strut 9 carries similar wheels 26 to support the rotor rim at the rear of the aircraft. This arrangement provides rigid support for the rotor both at the inner and outer rims and the supporting members for the outer rim are rigidly connected to the cab which provides the support for the inner rim. Thus, it will be seen that all of the parts of the aircraft are supported either directly or indirectly from the passenger cab, and that the various elements mutually cooperate to provide a rigid structure.

The vanes making up the rotor have an airfoil cross-section and are mounted and shaped so that they will lie in overlapping relation when in closed position to form a substantially solid disk which is thick adjacent the hub and feathers off to form a relatively thin outer rim. The cross sectional shape of the vanes may take a number of different forms, two of which are shown in Figures 9 to 12 of the drawings. It will be noted that in both of these forms the vanes interfit with one another when in closed position to form substantially continuous upper and lower surfaces for the disk. The vanes have a slight twist from hub to outer rim so that their angle is changed to provide the tapered cross section for the disk. It will be noted from the drawings that this twist permits the vanes to lie side by side near the hub where the disk circumference is relatively small and to lie substantially edge-to-edge near the outer rim where the circumference is greatly increased.

Each vane is mounted upon a pivot shaft 27. The inner end of each shaft is journalled to the inner rim 16, as shown at 28, and to the outer rim 18, as at 29. The journals 28 are within a housing 30 and a brake 31 is mounted in the housing to hold the pivot shaft in desired positions of adjustment. The journal 29 is enclosed in a housing 32 and a brake 33 similar to the brake 31 is mounted within the housing surrounding the end of the shaft. The brakes 31 and 33 are biased to braking position and each is operated by an electro-magnetic mechanism 34 to release the shaft so it may be free to rotate. The control for operating the mechanisms 34 may be located at any position convenient within the cab. As soon as the vanes have been adjusted, the brakes will be permitted to return to their normal holding positions to lock the vanes against movement.

Each shaft 27 is provided with a downwardly extending lever 35, which is mounted on the shaft near its inner end and within the hub channel 17. An operating cable 36 is connected to each lever 35 and passes around a pulley 37 mounted upon the shaft of a motor 38. The motor will also be controlled from the cab by any conventional means. The motor will be a reversible one, so that it can tilt the vanes in either direction. Motor 38 is mounted upon a platform 39 carried by the rotor inner rim 16 so that the motor will rotate with the rotor. In order to supply current to the motor a power track 40 is mounted into the lower flange 23 of the hub channel 17. The track is mounted in an insulating member 41 so that no current will be carried to other parts of the aircraft. The motor is provided with a depending contact 42 for sliding engagement with the track.

Power to operate the rotor is supplied by the engines 3. Each engine will be provided with a power take-off 43, connected by means of a shaft 44 mounted within the rigid wings 2 through gears 45 and shaft 46 to a drive pulley 47. There will be a drive pulley 47 mounted within the channel 17 on each side of the cab. Either of these pulleys may be operated by its engine to drive the rotor. Drive belts 48 encircle the drive pulleys and the inner rim 16 of the rotor to transmit motion from the drive pulleys to the rotor. The inner rim 16 becomes, in effect, a large driven pulley. As the rotor rotates, it moves freely within the channel 17 supported by the wheels 20. The outer rim moves between and is supported by the wheels 24, 25 and 26. Each of the wheels 24, 25 and 26 will be independently spring mounted to insure even guiding pressure on the outer rim.

The structure shown could be made from any desired material, but it is proposed to use aluminum or a plastic of minimum gauge to withstand the stresses which will be imposed. It will be noted that the engines are located with their weights slightly forward of the lateral axis of the aircraft and just beyond the outer rim of the rotor, with propellers of the pusher type. This will give the aircraft the required stability for flight. The aircraft operates as a helicopter in take-off and landing, and the propellers are used for forward flight when the desired elevation has been reached. In taking off, the electric motor will be operated to tilt the vanes 19 to the position shown in dotted lines in Figures 9 through 12. One of the engines will then be started, which will cause rotation of the rotor. The engine to be used will be the one whose propeller will exert a force contra to the tendency of the rotor to rotate the cab and other rigid structure. Thus, the propeller which is operating will have no effect in creating forward motion of the aircraft and the rotor will lift the aircraft vertically. When the desired altitude has been reached, the electric motor 38 will again be operated to close the vanes and the other engine will be started so that the aircraft will move forwardly. When the vanes have been closed the rotor will have no tendency to increase elevation, but the rotation will be continued for its stabilizing effect. During forward movement the aircraft will be operated and controlled in the same manner as conventional rigid-wing aircraft. Flaps 49 are hingedly connected to the engine nacelles and serve a similar purpose to the ailerons of conventional rigid-wing aircraft. It will be obvious with aircraft of this type that the disk serves as an airfoil and the rigid wing 2 can be of much smaller size than would be otherwise possible. The wing or disk loading per unit area can be changed by varying the diameter of the disk.

While in the above practical embodiments of the invention have been disclosed, it will be understood that variations may be made from the details of structure described and illustrated within the scope of the appended claims.

What is claimed is:

1. Convertible aircraft comprising, a cab, a disk having a plurality of tiltable vanes mounted upon axes radial to the disk and movable to positions at an angle to the horizontal plane of the disk and to form substantially continuous upper and lower surfaces for the disk, said disk being mounted upon and for rotation about said cab, a rigid wing connected to and extending transversely to either side of said cab, means carried by said wing to support the periphery of said disk, means to tilt said vanes, means to rotate said disk and means to propel said aircraft forwardly.

2. Convertible aircraft comprising, a cab, a disk having a plurality of tiltable vanes mounted upon axes radial to the disk and movable to positions at an angle to the horizontal plane of the disk and to form substantially continuous upper and lower surfaces for the disk, said disk being mounted upon and for rotation about said cab, a rigid wing connected to and extending transversely to either side of said cab and vertically spaced from said disk, a forward strut and a rearward strut extending from said cab, said wing, forward and rearward struts all having means to support the periphery of said disk, means to connect said wing with said forward and rearward struts, means to tilt said vanes, means to rotate said disk, and means to propel said aircraft forwardly.

3. Convertible aircraft comprising, a cab, a disk having an inner rim rotatably mounted about said cab and an outer rim concentric to the inner rim, a plurality of radially positioned and circumferentially spaced shafts having their ends journalled in said inner and outer rims, a vane mounted fixedly on each shaft, means carried by said disk to rotate said shafts to tilt said vanes, said vanes being shaped to form substantially continuous upper and lower surfaces for said disk when said vanes are in closed position, propellers mounted on either side of said disk for rotation in a vertical plane for forward propulsion of said aircraft, independent means to drive each of said propellers, both said propeller driving means being connected to said disk for driving said disk, whereby one and both of said propellers may be driven simultaneously with said disk.

4. In convertible aircraft as claimed in claim 3, said means to rotate said shafts including, arms fixed to said shafts radial to the axes thereof, means connecting said arms, and a reversible motor drivingly coupled to said connecting means.

5. Convertible aircraft comprising, a cab, a disk having an inner rim and an outer rim with a plurality of tiltable vanes mounted between the rims upon axes radial to the disk, said cab having an encircling hub to mount the inner rim of said disk, a belt about said inner rim, and means to drive said belt to rotate said disk, said means to drive said belt including an engine having a propeller coupled thereto for propelling the aircraft forwardly, a drive pulley encircled by said belt, and means coupling said engine to said drive pulley.

6. Convertible aircraft comprising, a cab, a disk having an inner rim and an outer rim with a plurality of tiltable vanes mounted between the rims upon axes radial to the disk, said cab having an encircling hub to mount the inner rim of said disk, a belt about said inner rim, means to drive said belt to rotate said disk, a rigid wing connected to and extending transversely to either side of said cab and vertically spaced from said disk, said means to drive said belt comprising, an engine supported at each end of said wing, each engine having a propeller coupled thereto for propelling the aircraft forwardly, drive pulleys mounted in said hub and encircled by said belt, and means coupling said engines to said drive pulleys.

7. Convertible aircraft comprising, a cab, a disk having an inner rim and an outer rim with a plurality of tiltable vanes mounted between the rims upon axes radial to the disk, said cab having an encircling hub to mount the inner rim of said disk, a belt about said inner rim, and means to drive said belt to rotate said disk, a rigid wing connected to and extending transversely to either side of said cab and vertically spaced from said disk, forward and rearward struts connected to said cab, means carried by said wing and said forward and rearward struts to support the periphery of said wing, means connecting said struts and said wing, said means to drive said belt comprising an engine supported at each end of said wing, each engine having a propeller coupled thereto to propel said aircraft forwardly, drive pulleys mounted in said hub and encircled by said belt, and means coupling said engines to said drive pulleys.

References Cited in the file of this patent
UNITED STATES PATENTS

| | | |
|---|---|---|
| 1,181,019 | Lansing | Apr. 25, 1916 |
| 2,377,835 | Weygers | June 5, 1945 |
| 2,521,684 | Bates | Sept. 12, 1950 |

FOREIGN PATENTS

| | | |
|---|---|---|
| 321,642 | Italy | Oct. 11, 1934 |
| 405,295 | Italy | Aug. 8, 1943 |
| 466,043 | Italy | Oct. 13, 1951 |
| 410,766 | France | Mar. 21, 1910 |